United States Patent Office 3,598,848
Patented Aug. 10, 1971

3,598,848
GROUP VI-B TRANSITION METAL-AMINO-PHOSPHORODITHIOATES AND METHOD FOR PRODUCING SAME
Phyllis Dodds, Wysox, and Vincent Chiola, Towanda, Pa., assignors to Sylvania Electric Products Inc.
No Drawing. Filed Sept. 5, 1968, Ser. No. 757,788
Int. Cl. C07f 11/00; C10m 1/48
U.S. Cl. 260—429R                 14 Claims

ABSTRACT OF THE DISCLOSURE

Group VI-B transition metal-amino-phosphorodithioates, which are the reaction products of amine salts of Group VI-B oxyacids and phosphorodithioic acids, are disclosed. A process for producing the before-mentioned compounds is also disclosed that comprises contacting an acidic aqueous medium containing the Group VI-B metal source with a water-immiscible organic medium containing an alkyl amine and reacting said product with a phosphorodithioic acid and recovering the compounds of this invention. Lubricating compositions containing the compounds of this invention are also disclosed.

BACKGROUND OF THE INVENTION

This invention relates to oil-soluble Group VI-B transition metal-amino-phosphorodithioates, to processes for producing same and to lubricating oil compositions containing the compounds.

Present day lubricating oils and greases contain various additives that impart to the compositions desirable characteristics such as detergency, antioxidant, antisludge, anticorrosion and antiwear properties. To achieve a suitable composition several additives generally have to be added. For example, zinc dialkyldithiophosphates, which are produced by neutralizing the reaction product of phosphorus pentasulfiide and an alcohol with sodium hydroxide and thereafter replacing the sodium ions with zinc ions in an aqueous medium impart some of the above characteristics such as antioxidant, antiwear and anticorrosion activity. Other materials such as the amine salts of molybdic or tungstic acid are used to impart sludge dispersancy, high-temperature detergency and antifriction properties. Other additives which are used include the adducts of the zinc phosphorothioates and alkylene oxides such as the lower alkylene oxides having an alkylene radical containing 6 or less carbon atoms. The materials are used to impart improved detergency and corrosion resistance to the oil composition. In each instance, however, more than one additive is required to achieve many of the desired characteristics. It is believed, therefore, than an additive containing more of the desired properties in a single compound thereby reducing the number of additives required is an advancement in the art. Furthermore, it is believed that the process for producing such compounds, due to its flexibility and simplicity, is also an advancement in the art.

SUMMARY OF THE INVENTION

In accordance with one aspect of this invention, there is provided new compositions which are the reaction products of the amine salts of the various Group VI-B oxyacids and the compounds of the formula

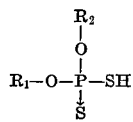

Formula 1 wherein $R_1$ and $R_2$ are each hydrocarbon radicals selected from the group consisting of alkyl, aryl and alkaryl, having from about 1 to about 30 carbon atoms.

A second aspect of this invention is the process for preparing said compounds. The process is relatively free of operating difficulties and has a large degree of flexibility, and in general, involves:

(1) Contacting an aqueous medium comprising water and a water-soluble Group VI-B transition metal source, said medium being at a pH of below 7, preferably at a pH of from about 0 to about 4, with a water-immiscible organic medium comprising a water-immiscible solvent and an alkyl amine, for a time sufficient to extract at least some of the transition metal from the aqueous medium into the organic medium thereby forming an amino-Group VI-B transition metal reaction product;

(2) Separating the organic and aqueous mediums;

(3) Recovering the Group VI-B transition metal-amino-phosphorodithioic composition by providing the following steps, in any order:

(a) adding a phosphorodithioic acid to the amino-Group VI-B transition metal reaction product, and
(b) removing the organic, water-immiscible solvent from the organic medium thereby recovering the compounds of this invention.

If desired, the process of this invention can be carried out in a different sequence of operating steps with equally good results. Therefore, in accordance with another embodiment of this invention, an aqueous medium comprising water and Group VI-B transition metal source is contacted with a water-immiscible organic medium comprising a water-immiscible organic solvent, an alkyl amine and phosphorodithioic acid. An additional aspect of this invention is a lubricating composition containing the amino-Group VI-B transition metal-phosphorodithioic compositions in specified amounts.

For a better understanding of the present invention, together with other and further objects, advantages and capabilities thereof, reference is made to the following disclosure and appended claims in connection with the above description of the invention.

DESCRIPTION OF THE PREFERRED EMBODIMENTS

The weight percentage of the Group VI-B transition metal can be varied depending upon the quantity of Group VI-B transition metal desired in the additive and will be dependent upon the amount of the foregoing metal present in the aqueous solution and the amount of the dialkyl phosphorodithioic acid used in the process. For example, the molybdenum containing compositions of the present invention will generally contain from about 6–10% by weight of sulfur, 2–4% by weight of phosphorus, 2–7% by weight of molybdenum and from 1–2% nitrogen. The weight percentages of the foregoing components will vary depending upon the molecular weight of the Group VI-B transition metal that is used. For example, the foregoing compositions wherein tungsten is the Group VI-B transition metal, will contain from about 4 to about 7% sulfur, about 1–3% phosphorus, about 2–13% tungsten and from about 0.5 to 1.5% nitrogen. With chromium-containing compositions the weight percentage of chromium is decreased with the corresponding increase in the other elements due to its lower molecular weight. The Group VI-B transition metal containing radical will in most instances be the transition metallic oxycations represented by the formula $M_xO_y$ wherein M is the Group VI-B transition metal, $x$ is an integer from 1–30, $y$ is an integer from 1–90 and the valence of $M_xO_y$ is from 1 to 15. The compounds of this invention, therefore, enable a large degree of flexibility which was heretofore only achieved by blending several additives.

Lubricating oils which can be used as the base oils to which the new compounds of this invention are added are not limited as far as the effectiveness of the compounds are concerned, therefore, lubrication oils that are of a lubricating viscosity can be used. For example, oils that have a naphthenic base, paraffinic base and other hydrocarbon bases, as well as lubricating oils derived from coal products and synthetic oils, such as the alkylene polymers, alkylene oxide polymers, dicarboxylic acid esters, alkylated benzene, silicate esters, silicon polymers and the like are suitable.

In general, any water-soluble Group VI–B transition metal source can be used, that is a material which contains chromium, molybdenum or tungsten and that is soluble to the extent of at least 0.1 gram per 100 grams of water at 25° C. Suitable sources of Group VI–B transition metals include water-soluble Group VI–B transition metal oxides, Group VI–B transition metal oxyhalo compounds, Group VI–B transition metal peroxy compounds, ammonium and alkali metal salts of Group VI–B transition metal peroxyacids. The alkali metal salts of the Group VI–B transition metal peroxyacids, such as sodium, potassium and lithium molybdates, sodium potassium and lithium tungstates and the like, are preferred with the sodium salts being especially preferred. Although any of the Group VI–B transition metals, that is either chromium, molybdenum or tungsten can be used, molybdenum and tungsten are preferred.

In most instances, an aqueous solution having a Group VI–B transition metal concentration of from about 1% to about 10% by weight is preferred. In some instances concentrations of as low as about 0.1% by weight can be used, however, these lower concentrations are not preferred since there are no additional beneficial results achieved from using the lower concentrations and the excess water can create disposal problems. Although higher concentrations can be used such as those containing a metal concentration greater than about 15% by weight, such high concentrations generally approach saturated solutions which can result in either a yield loss or require recycle of the aqueous medium. The pH of the aqueous medium is below about 7 with a pH of from about 0 to about 4 being preferred in most instances. Use of a higher pH prevents extraction and formation of the compounds of this invention.

The phosphorodithioic acids which can be used in practice of this invention are well known in the lubricating art and in general contain two hydrocarbon radicals selected from the group consisting of alkyl, aryl and alkaryl and from about 1 to about 30 carbon atoms. As is known in the art, since the phosphorodithioic acids are often prepared from mixtures of alcohols and phosphorus pentasulfide, the carbon atom content of the hydrocarbon group is an average value for the mixture. For example, one of the preferred phosphorodithioic acids is one in which the hydrocarbon radicals are alkyl groups having an average chain length of about 5 carbon atoms. In some instances, however, relatively pure phosphorodithioic acids are produced and these are also good raw materials. For example, one of the preferred raw materials is di-isotyl phosphorodithioic acid.

When the amines are described herein as being water-insoluble, it is meant that less than about 0.1 gram will dissolve in 100 cc. of water at 25° C. When the amines are described herein as soluble in the water-immiscible organic solvent, it is meant that greater than about 0.1 gram, will dissolve in 100 cc. of the organic solvent at 25° C. The amines which are suitable therefore, are the alkyl amines that are soluble in a water-immiscible, organic solvent of a class to be hereinafter described and insoluble in water. These useful amines are alkyl amines selected from those of the formula

Formula 2 wherein $R_3$, $R_4$, and $R_5$ are each selected from the group consisting of hydrogen and alkyl containing from about 3 to about 30 carbon atoms and wherein at least one of $R_3$, $R_4$ and $R_5$ is alkyl and the total number of carbon atoms is from about 3 to about 60 carbon atoms. The alkyl groups can be either straight or branched chain and can be a mixture of compounds containing alkyl radicals of varying chain lengths but having a given average value. The amines as described above can be either primary, secondary or tertiary amines. For example, suitable primary amines include trialkyl-methyl amines of the formula

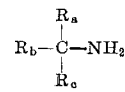

Formula 3 wherein $R_a$, $R_b$ and $R_c$ are each alkyl radicals containing from 1 to about 20 carbon atoms. Typical commercially available amines of the above class are those wherein two of the radicals represented by $R_a$, $R_b$ and $R_c$ in Formula 3 above are methyl and the other radical can vary from about 15 to about 21 carbon atoms.

Suitable secondary alkyl amines that are water insoluble and organic solvent soluble are selected from amines of the formula

Formula 4 wherein R' and R" are each alkyl containing from 3 to 30 carbon atoms. For example, a commercially available suitable amine is an amine wherein R' is an alkyl radical containing from about 11 to about 14 carbon atoms and R" is an undecyl radical.

Tertiary amines, that is those of the formula

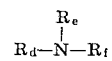

Formula 5 wherein $R_d$, $R_e$ and $R_f$ are each alkyl radicals containing from about 3 to about 30 carbon atoms. The R groups can be either straight or branched chain and can be the same or different radicals. Commercially available amines include those of Formula 5 wherein $R_d$, $R_e$ and $R_f$ each vary from about 8 to about 13 carbon atoms.

It has been found that the volumetric ratio of the amine to the solvent in the organic medium should be between about 10:90 to about 90:10. Use of higher and lower concentrations reduces the efficiency of the process, therefore, are not generally used.

The organic solvents which can be used in the practice of this are those that are essentially immiscible with water, that is those that have a solubility of less than 0.1 gram of solvent/100 cc. of water at 25° C. and have a boiling point less than about 250° C. In most instances the aromatic organic solvents, that are immiscible with water, such as benzene, toluene, cumene, xylene, naphthalene and other petroleum fractions containing aromatic hydrocarbons that have boiling points below about 250° C., will be used. If desired, however, the solvent can be selected from the cycloparaffins that have the foregoing water-immiscible and boiling point properties, such as cyclohexane, cyclopentane and the like. Although the solvent can have a boiling point as high as 250° C., since the solvent is subsequently removed from the compounds of the present invention, normally by distillation, it is preferred to use solvents having relatively low boiling points, that is below about 150° C. with those having a boiling point of below about 120° C. being especially preferred. Since the process is carried out in liquid phase, on order to avoid potential losses of solvent or the use of pressurized equipment, it is generally preferred to use solvents having a boiling point above about 50° C.

The time the aqueous and organic media are in contact is immaterial from an operative standpoint, however, in order to achieve relatively high yield, without recycle, the contact time should be sufficient to extract essentially all of the Group VI–B transition metal into the organic phase. In most instances, when the aqueous solution concentration of transition metal is within the preferred range as heetofore specified, the length of contact is not excessive, that is generally below about 10 hours. Since the organic and aqueous media are readily separable, it is generally relatively simple to determine if the extraction is complete. For example, after the organic and aqueous media have been in contact for a reasonable period of time, that is, longer than about 30 minutes, the two media can be allowed to separate by allowing them to stand without agitation and then sample one of the media and analyze for the presence of the transition metal. In most instances the aqueous medium will be analyzed to determine the degree of extraction that has occurred. As previously mentioned, the organic and aqueous media separate easily, therefore conventional techniques for the separation of immiscible liquids can be used such as gravity separating, decanting and the like.

After the two media are separated, the phosphorodithioic acid can be added either to the organic medium and thereafter the solvent removed or the solvent can be removed before the addition of the phosphorodithioic acids. In most instances it is preferred to add the acid prior to removal of the solvent because the amino-transition metal salts are relatively viscous. In most instances distillation will be the preferred method of removing the organic solvent for either media. As can be appreciated the solvent can be condensed and recycled if desired.

To further illustrate certain embodiments of the present invention, the following non-limiting examples are presented. All parts, proportions and percentages are by weight unless otherwise indicated.

Example I

Four solutions containing 50, 60, 70, and 85 percent by volume of a mixture of trialkyl straight chain symmetrical tertiary amines in benzene are contacted with equal volumes of 3 M $H_2SO_4$. The amines mixture is about 60% tridecyl amine and 40% trioctyl amine. An aqueous solution of sodium tungstate is acidified to pH 2 with sulfuric acid. The concentration of tungsten in the aqueous solution is about 200 grams/liter, $WO_3$ basis. Equal volumes of organic and aqueous phases are contacted for about 20 minutes. After settling, aliquots of both phases are taken and isotope studies showed ≧99% extraction of tungsten from the aqueous medium to the organic medium. The organic medium is retained and the benzene is evaporated to isolate the active ingredient which is a viscous salt. The viscous salts are mixed with equal volumes of di-isoctyl phosphorodithioic acid and heated to obtain the reaction between the salts and acid bath. The liquid product is soluble in 10W motor oil.

Example II

Organic solutions A, B, and C containing 70% by volume of three different amines in benzene are contacted with equal volumes of 3 M $H_2SO_4$. The three amines used are given in the following solutions:

(A) A mixture of amines having the formula

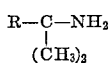

wherein the R groups are alkyl containing from about 15 to about 21 carbon atoms.

(B) A mixture of amines having the formula

wherein the R' group contains from about 11 to about 14 carbon atoms and R'' contains about 11 carbon atoms.

(C) A mixture of amines having the formula

wherein the R groups are $C_{13}H_{27}$ having different degrees of branching.

The amine solutions are then contacted for about 30 minutes with equal volumes of an aqueous solution of $Na_2WO_4$, acidified to pH 2, with sulfuric acid and containing about 200 g./liter, $WO_3$ basis. After settling, the aqueous phases are analyzed for tungsten. About 210 g./l., $WO_3$ basis, is extracted into the organic media based upon the analysis of the aqueous phases. The amount of sulfur, as contained in the dithiophopshoric acids, needed to react with the tungsten in the organic media to form $WS_2$ is calculated, and about 36 volumetric parts of a C–8 dialkyl phosphorodithioic acid are added to 100 volumetric parts of the amine-tungsten salts and gently heated. A 1% solution, by volume, is added to 10W motor oil. All are soluble and compatible with all commercial motor oils.

Example III

Essentially the same procedure is used as in Example I except that various phosphorodithioic acids are used in conjunction with various amines. Samples of the reaction product are analyzed for S, P, and W. Results of analysis are given below.

| Sample | Amine solution | Phosphorodithioic acid | Wt. percent | | |
|---|---|---|---|---|---|
| | | | S | P | W |
| 1 | A | E[2] | 4.82 | 2.6 | 12.38 |
| 2 | A | F[3] | 4.57 | 2.24 | 12.27 |
| 3 | B | E | 5.31 | 2.66 | 12.00 |
| 4 | B | F | 5.12 | 1.78 | 11.39 |
| 5 | C | E | 6.37 | 2.45 | 3.90 |
| 6 | C | F | 5.05 | 1.47 | 3.58 |
| 7 | D[1] | E | 7.09 | 2.67 | 2.49 |
| 8 | D | F | 6.40 | 1.60 | 4.24 |

[1] D=Amine as described in Example I.
[2] E=A mixed dialkyl phosphorodithioic acid wherein the alkyl groups contain various chain lengths with an average value of 5 carbon atoms in each alkyl group.
[3] F=Di-isooctyl phosphorodithioic acid.

Infrared absorption spectra are obtained on each of the above samples. All samples have strong lines at 680, 980, 1165, 1380 and 2940 cm.$^{-1}$. Samples 1 and 2 have two additional strong peaks at 1520 and 1620 cm.$^{-1}$ and Samples 3 and 4 have one additional strong peak at about 1600. The above results indicate some differences in patterns when different amines are used. For example, Samples 1 and 2 were produced from a primary amine. Samples 3 and 4 were produced from secondary amines, while Samples 5–8 were produced from tertiary amines. Moderate absorption peaks were attained on all samples at 670, 880, 1205, 1370, 1440, 1500, 3040 and 3400 cm.$^{-1}$.

Example IV

Essentially the same procedure as in Example III is followed except that molecular equivalent amounts of sodium molybdate are substituted for the sodium tungstate. Samples of the reaction products are analyzed for weight percent S, P and Mo. Results of these analysis are given below.

| Sample | Amino solution | Phosphorodithioic acid | Wt. percent | | |
|---|---|---|---|---|---|
| | | | S | P | Mo |
| 1 | A | E | 9.03 | 2.99 | 5.04 |
| 2 | A | F | 7.40 | 2.16 | 5.12 |
| 3 | B | E | 9.34 | 3.25 | 2.09 |
| 4 | B | F | 7.54 | 2.09 | 2.50 |
| 5 | C | E | 8.12 | 2.79 | 4.42 |
| 6 | C | F | 6.14 | 2.07 | 4.83 |
| 7 | D | E | 9.82 | 3.48 | 6.55 |
| 8 | D | F | 7.67 | 2.57 | 5.85 |

Infrared absorption spectra are obtained on all samples. Strong absorption peaks appear at 680, 980, 1165, 1470 and 2940 cm.$^{-1}$. Moderate peaks appear at 600, 615, 710, 820, 870, 890, 1040, 1110, 1205, 1440, 1500, 1560, 2430, 2880, 3040 and 3100 cm.$^{-1}$. The same strong lines appear when primary and secondary amines are used as were present in Example III.

Example V

Samples of lubricating oil compositions are prepared by dissolving about 10% by volume of the compositions prepared in Examples III and IV in 10W motor oil. Samples of the above lubricating compositions when heated to about 120° C. for about 2 hours indicated no sludge formation. When heated in the presence of aluminum and lead indicate no corrosion of either metal. The above tests indicate the properties which are suitable as additives for lubricating compositions.

The compositions of this invention will be used in amounts of less than about 10% by weight of the total lubricating composition. In most instances at least about 1% of the composition will be used. It is also to be noted that often it can be advantageous to produce a relatively concentrated solution containing a lubricating oil and a major amount of the compositions of this invention then add this solution to the lubricant to yield a mixture having the foregoing percentages by weight of the composition of this invention.

While there has been shown and described what is at present considered the preferred embodiments of the invention, it will be obvious to those skilled in the art that various changes and modifications may be made without departing from the scope of the invention as defined by the appended claims.

We claim:
1. A process for producing an oil-soluble, Group VI-B transition metal-amino-phosphorodithioic compositions, suitable for use as a lubricating oil additive, said process comprising:
   contacting an aqueous medium, having a pH of below about 7, and comprising water and a Group VI-B transition metal source, with a water-immiscible organic medium comprising a water-immiscible organic solvent and an alkyl amine, for a time sufficient to extract at least a major portion of said transition metal from said aqueous medium into said organic medium thereby forming an amino-Group VI-B transition metal reaction product;
   separating said organic medium and said aqueous medium; and
   recovering the Group VI-B transition metal-amino-phosphorodithioic composition by providing the following steps in any order:
   (1) removing said water-immiscible organic solvent, and
   (2) adding a phosphorodithioic acid to said amino-Group VI-B transition metal reaction product.

2. A process according to claim 1 wherein said Group VI-B transition metal is tungsten.

3. A process according to claim 1 wherein said Group VI-B transition metal is molybdenum.

4. A process according to claim 1 wherein said amine is selected from the group consisting of primary, secondary and tertiary alkyl amines containing from about 3 to about 60 carbon atoms.

5. A process according to claim 4 wherein said organic solvent is an aromatic hydrocarbon solvent.

6. A process according to claim 5 wherein said Group VI-B transition metal is tungsten.

7. A process according to claim 5 wherein said Group VI-B transition metal is molybdenum.

8. A process for producing an oil-soluble Group VI-B transition metal-amino-phosphorodithioic compositions, suitable for use as a lubricating oil additive, said process comprising:
   contacting an aqueous medium having a pH of below about 7 and comprising water and a Group VI-B transition metal source, with a water-immiscible organic medium comprising a water-immiscible organic solvent, an alkyl amine and a phosphorodithioic acid, for a time sufficient to extract at least a major portion of said transition metal from said aqueous medium into said organic medium, thereby forming an amino-Group VI-B transition metal phosphorodithioic reaction product;
   separating said organic medium and said aqueous medium; and
   recovering the Group VI-B transition metal-amino-phosphorodithioic composition by removing said water-immiscible organic solvent.

9. A process according to claim 8 wherein said Group VI-B transition metal is tungsten.

10. A process according to claim 8 wherein said Group VI-B transition metal is molybdenum.

11. A process according to claim 8 wherein said amine is selected from the group consisting of primary, secondary and tertiary alkyl amines containing from about 3 to about 60 carbon atoms.

12. A process according to claim 11 wherein said organic solvent is an aromatic hydrocarbon solvent.

13. A process according to claim 12 wherein said Group VI-B transition metal is tungsten.

14. A process according to claim 12 wherein said Group VI-B transition metal is molybdenum.

References Cited

UNITED STATES PATENTS

| | | | |
|---|---|---|---|
| 2,737,492 | 3/1956 | Beegle et al. | 252—32.7 |
| 3,114,712 | 12/1963 | Spengler et al. | 252—46.4 |
| 3,282,838 | 11/1966 | Knowles et al. | 252—49.7 |
| 3,290,245 | 12/1966 | Elliott et al. | 252—32.7 |
| 3,351,647 | 11/1967 | Butler et al. | 260—429.9 |

TOBIAS E. LEVOW, Primary Examiner

A. P. DEMERS, Assistant Examiner

U.S. Cl. X.R.

252—32.7E; 260—438.5R, 429K